Feb. 15, 1966   M. B. HOLLANDER   3,235,312
FRICTION WELDED WHEEL AND RIM
Filed Dec. 23, 1963
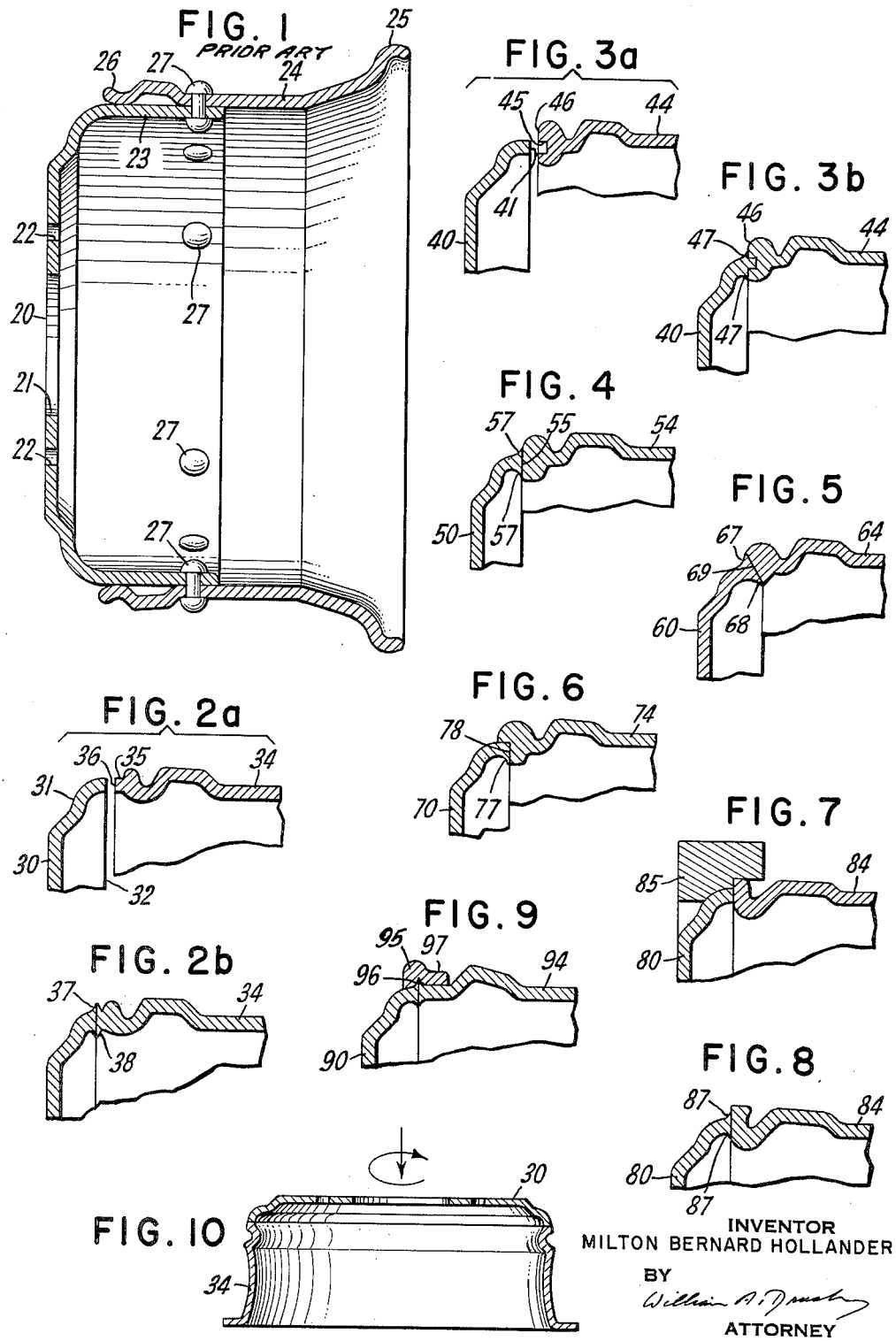
INVENTOR
MILTON BERNARD HOLLANDER
BY
William A. Donahue
ATTORNEY

United States Patent Office 3,235,312
Patented Feb. 15, 1966

3,235,312
FRICTION WELDED WHEEL AND RIM
Milton Bernard Hollander, Stamford, Conn., assignor to American Machine & Foundry Company, a corporation of New Jersey
Filed Dec. 23, 1963, Ser. No. 332,769
11 Claims. (Cl. 301—63)

This invention relates in general to manufacture of articles assembled by means of friction welding and, more particularly, to the friction welding of large diameter objects having a relatively narrow weld area.

Motor vehicle wheels particularly truck wheels and the like, are conventionally fabricated from a disk portion and a rim portion. The disk portion is made with an annular edge which extends within the rim portion from one side so that the annular edge may be riveted within the rim portion to assemble a complete wheel. The resulting overlapping of the rim portion and the edge of the disk wastes material and adds weight to the completed wheel without increasing its strength.

An object of this invention is to provide a lighter, stronger, and less expensive motor vehicle wheel.

Another object of this invention is to provide workpiece configurations which enable large diameter and relatively thin walled workpieces to be friction welded.

A further object of this invention is to provide means to control the formation of upset during the friction welding of large diameter workpieces so that the machining of upset from the completed workpieces is not required.

An additional object of this invention is to provide a ring collar member to control the formation of upset during the friction welding of large diameter, thin walled workpieces. The ring collar member controls the formation of upset and assists in maintaining the alignment of the workpieces during friction welding. If desired, the collar can remain as part of the completed friction welded product.

Many other objects, advantages and features of invention reside in the particular construction, combination and arrangement of parts involved in the embodiments of this invention and its practice as will be understood from the following description and accompanying drawing wherein:

FIGURE 1 is a transverse vertical section through a conventional truck wheel;

FIGURE 2a is a transverse section through a fragment of a rim and a wheel disk having a first configuration, the fragments being positioned for friction welding;

FIGURE 2b is a transverse section through the fragments of FIGURE 2a after they have been friction welded;

FIGURE 3a is a transverse section through a fragment of a rim and a wheel disk having a second configuration, the fragments being positioned for friction welding;

FIGURE 3b is a transverse section through the fragments of FIGURE 3a after they have been friction welded;

FIGURE 4 is a transverse section through a fragment of a rim and a wheel disk having a third configuration and after being friction welded;

FIGURE 5 is a transverse section through a fragment of a rim and a wheel disk having a fourth configuration and after being friction welded;

FIGURE 6 is a transverse section through a fragment of a rim and a wheel disk having a fifth configuration and after being friction welded;

FIGURE 7 is a transverse section through a fragment of a rim, a wheel disk, and an upset constraining ring collar shown in position prior to friction welding the disk to the rim;

FIGURE 8 is a transverse section through the rim and the wheel disk of FIGURE 7 after they have been friction welded ;

FIGURE 9 is a transverse section through a fragment of a rim, a wheel disk, and an upset containing ring collar after the rim and the disk have been friction welded together with the upset from the weld securing the ring collar in place about the resulting wheel; and, FIGURE 10 is a transverse vertical section through a disk and a rim showing the disk being friction welded to the rim.

Referring to the drawing in detail, FIGURE 1 shows a conventional truck type wheel having a disk 20 containing a large central aperture 21 through which an axle may protrude. Holes 22 are formed in the disk 20 about the aperture 21 so that lug bolts extending from a vehicle axle flange (not shown) may project through them to fasten the wheel to the flange. A conventional truck-type wheel disk 20 has a circumferential edge portion 23 which is formed at substantially right angles to the disk 20.

A wheel rim 24 has an outer lip 25 formed on it to retain a tire. A split ring (not shown) seats in a groove 26 to restrain the other side of a mounted tire. A number of rivets 27 extend through the edge 23 and the rim 24 to fasten them together and form a complete truck wheel. Thus it may readily be seen that the edge 23 must extend a considerable distance into the rim 24 to be secured by the rivets 27. This wastes material and adds to the weight of a conventional wheel without strengthening it.

Vehicle wheels in general, and truck wheels in particular, must be very securely assembled so that they will not fail under the excessive stresses and shocks to which they are subjected in service. A superior, lighter weight wheel results from friction welding the wheel disk to the wheel rim.

As shown in FIGURE 2a, disk 30 has its circumferential edge portion 31 formed with a flat circular end 32. The rim 34 has a projection 35 with a flat circular end portion 36 corresponding to the end portion 32 of disk 30.

As shown in FIGURE 10, disk 30 may be friction welded to rim 34 by securing rim 34 and rapidly rotating disk 30 while forcing it against rim 34. When sufficient heat of friction is developed in the area of contact between the surfaces 32 and 36, the relative rotation is repidly stopped as the workpieces are continued to be forced together. As shown in FIGURE 2b, the metal in the weld area becomes plastic and deforms as the weld is completed. This flow of metal forms the upset 37 and 38. The rim may also be rotated alone or counter rotated.

Vehicle wheels are normally made of low carbon steel such as AISA 1018 steel. These wheels should be welded with a relative surface speed in the weld area of from 15 to 70 feet per second at a pressure of from one to ten thousand pounds per square inch in the weld area. It requires between ten thousand and one hundred thousand foot pounds of energy for each square inch of weld area.

Since the rims and disks are relatively thin walled sections in relation to the diameter of the weld, the elements may tend to deform or axially deflect while being welded so that the contacting edges of the rims and the disks will spring laterally and reduce the effective weld area. This is not permissible in an article of manufacture as critical as a vehicle wheel on which human life depends.

FIGURE 3a shown a disk 40 and a rim 44. The rim 44 is prepared to constrain the area of contact between the disk and the rim during friction welding. For this purpose a circular groove 45 is formed in the edge 46 of rim 44 so that the edge 41 of disk 40 will extend within groove 45. As shown in FIGURE 3b, upset 47 flows out of groove 45 adjacent to it.

FIGURE 4 shows a rim 54 having a wide flat surface 55 which is contacted by the edge of a disk 50. Slight misalignment of the disk 50 and rim 54 will not reduce the weld area but will merely shift the weld area on the surface 55. The upset 57 and 58 of the completed weld lies along surface 55.

As shown in FIGURE 5, a rim 64 and a disk 60 are prepared with corresponding sloping edges which are conical sections and tend to keep the workpieces aligned during friction welding. Thus the weld area is conical in section and upset 67 and 68 from the weld flows along the larger beveled surface 69 formed on the rim 64.

FIGURE 6 shows a rim 74 having an inwardly facing annular shoulder 78 against which the edge of disk 70 is seated during friction welding. The upset 77 from the weld flows along this annular shoulder and is thus generally confined to the inner side of the weld.

Since rough flashing or upset is not desirable on the outer side or surface of a completed wheel, the embodiments of this invention shown in FIGURES 2a through 5 may require a machining operation to remove or smooth the upset on the completed wheel. The embodiment shown in FIGURE 6 may require a similar operation although control of the weld can prevent or greatly reduce the formation of upset on the outside of the weld area.

FIGURE 7 shows a rim 84 and a disk 80 positioned together prior to their being friction welded. Disk 80 and rim 84 have a configuration similar to that shown in FIGURE 4. A relatively massive ring collar 85 is placed about the disk 80 and the rim 84 in intimate contact with these workpieces about the outside of the weld area. This ring collar may be of a steel alloy or it may be of a high heat conductive material such as copper so that it will act as a heat sink. If desired, collar 85 may be made of a combination of materials. During the friction welding of workpieces 84 and 80, the collar 85 prevents upset from extending outward and thus renders unnecessary any machining of upset from the outside of the resulting wheel. The upset 87 from the weld flows inward.

Ring collar 85 may be formed as shown so that it may be made in a single piece to be removed from the completed wheel in an axial direction. If required, ring collar 85 may be a suitable ring divided into segments so that it can conform to any desired configurations of workpieces and still be removed after the completion of the weld.

FIGURE 9 shows a wheel disk 90 and a rim 94 which is formed without a circumferential groove similar to that indicated by the numeral 26 in FIGURE 1. The weld configuration of the workpieces 90 and 94 is similar to that of the workpieces shown in FIGURES 2a and 2b. A ring collar 95 containing an inner circumferential groove 96 above the weld area is placed about the workpieces 90 and 94. Upon completion of a friction weld, as shown in FIGURE 9, upset from the weld area flows into groove 96 to secure the ring collar 95 in place. Both ring collars 85 and 95 serve to control the upset produced while making a friction weld and they serve to maintain proper alignment of relatively thin walled workpieces during the making of a friction weld. In addition, ring collar 95 becomes an integral part of the resulting wheel assembly and forms one side of a circumferential groove 97 into which a conventional split ring may be placed to secure a tire on rim 94.

What is claimed is:

1. In the friction welding of a vehicle wheel rim to a wheel disk, the steps of forming corresponding surfaces of the rim and the disk, placing a ring collar about the corresponding surfaces to constrain the rim and the disk from radial movement relative to each other, forcing the rim and disk together as they are rotated relative to each other to generate heat of friction at the corresponding surfaces, and stopping the relative rotation of the rim and disk while forcing them together to complete a friction weld with the ring collar constraining the flow of upset from the corresponding surfaces.

2. The process according to claim 1 wherein upset constrained by the ring collar secures the ring collar on the disk and rim.

3. A vehicle wheel comprising a generally cylindrical rim portion, and a disk portion, said disk portion and one side of said rim having corresponding engaged surfaces, said disk being friction welded to said rim at said corresponding surfaces forming a welded joint, the metal from at least one of said surfaces being flared outward at said welded joint in a bell mouth shape in at least one member as viewed in axial section.

4. The combination according to claim 3 wherein said corresponding surfaces are substantially parallel to said disk.

5. The combination according to claim 4 wherein one of said corresponding surfaces is substantially wider than the other of said corresponding surfaces.

6. The combination according to claim 3 wherein said corresponding surfaces are inclined at an angle to said disk.

7. The combination according to claim 3 wherein the side of said rim having a corresponding surface has an annular shoulder formed about the inner portion of the side of said rim, the corresponding surface of said rim being said annular shoulder.

8. A vehicle wheel comprising, in combination, a generally cylindrical rim, a disk having a circumferential edge portion extending toward one side of said rim, said rim and said circumferential edge portion having corresponding surfaces, said rim being friction welded to said disk at said corresponding surfaces, and a ring collar disposed about said rim and said circumferential edge portion of said disk about said corresponding surfaces, said ring collar containing upset flowing from said corresponding surfaces.

9. The combination according to claim 8 wherein upset flowing below said ring collar secures said ring collar about said disk and said rim.

10. The combination according to claim 8 wherein said ring collar contains an inner groove disposed about said corresponding surfaces, upset from said corresponding surfaces flowing into said groove securing said ring collar about said disk and said rim.

11. A vehicle wheel comprising generally a cylindrical rim portion, and a disk portion, said disk portion and one side of said rim having corresponding engaged surfaces, said disk being friction welded to said rim at said corresponding surfaces, said surfaces being engaged in a circumferential groove, said groove being filled with upset material from the weld at the bottom thereof.

References Cited by the Examiner

UNITED STATES PATENTS

| 1,821,663 | 9/1931 | Murray et al. | 29—159.01 X |
| 1,952,404 | 3/1934 | Woodward | 301—63 |
| 2,258,913 | 10/1941 | Stone | 29—491 X |
| 3,134,278 | 5/1964 | Hollander et al. | 29—470.3 X |
| 3,144,710 | 7/1964 | Hollander et al. | 29—470.3 |

FOREIGN PATENTS

| 48,010 | 6/1937 | France. |
| 812,009 | 4/1937 | France. |
| 1,003,182 | 11/1951 | France. |

BENJAMIN HERSH, *Primary Examiner.*

ARTHUR L. LA POINT, *Examiner.*